Nov. 20, 1928.
A. W. CAPS ET AL
1,692,544
PHOTOGRAPHIC COPYING MACHINE
Filed Jan. 19, 1924   3 Sheets-Sheet 1
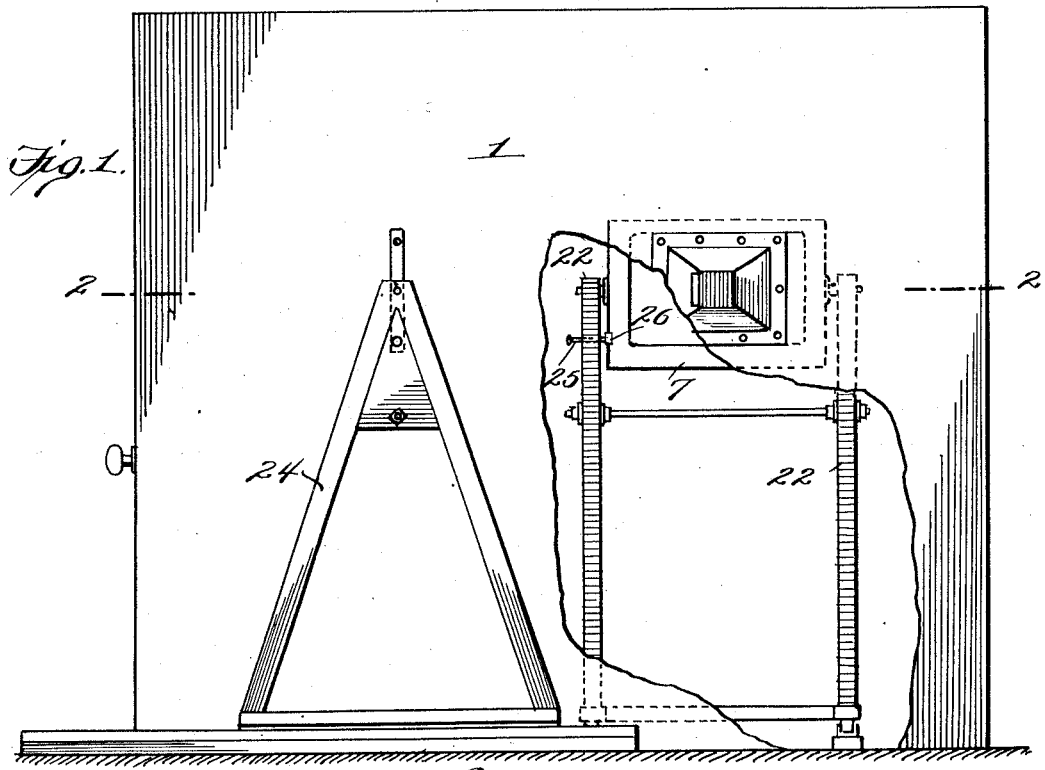
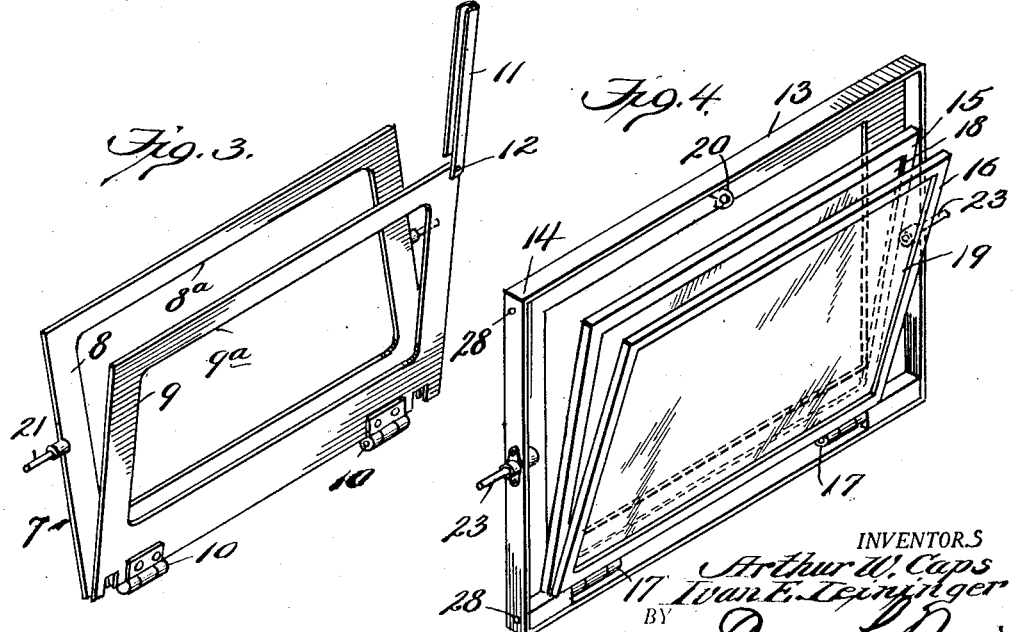
INVENTORS
Arthur W. Caps
Ivan E. Leininger
BY
ATTORNEY.

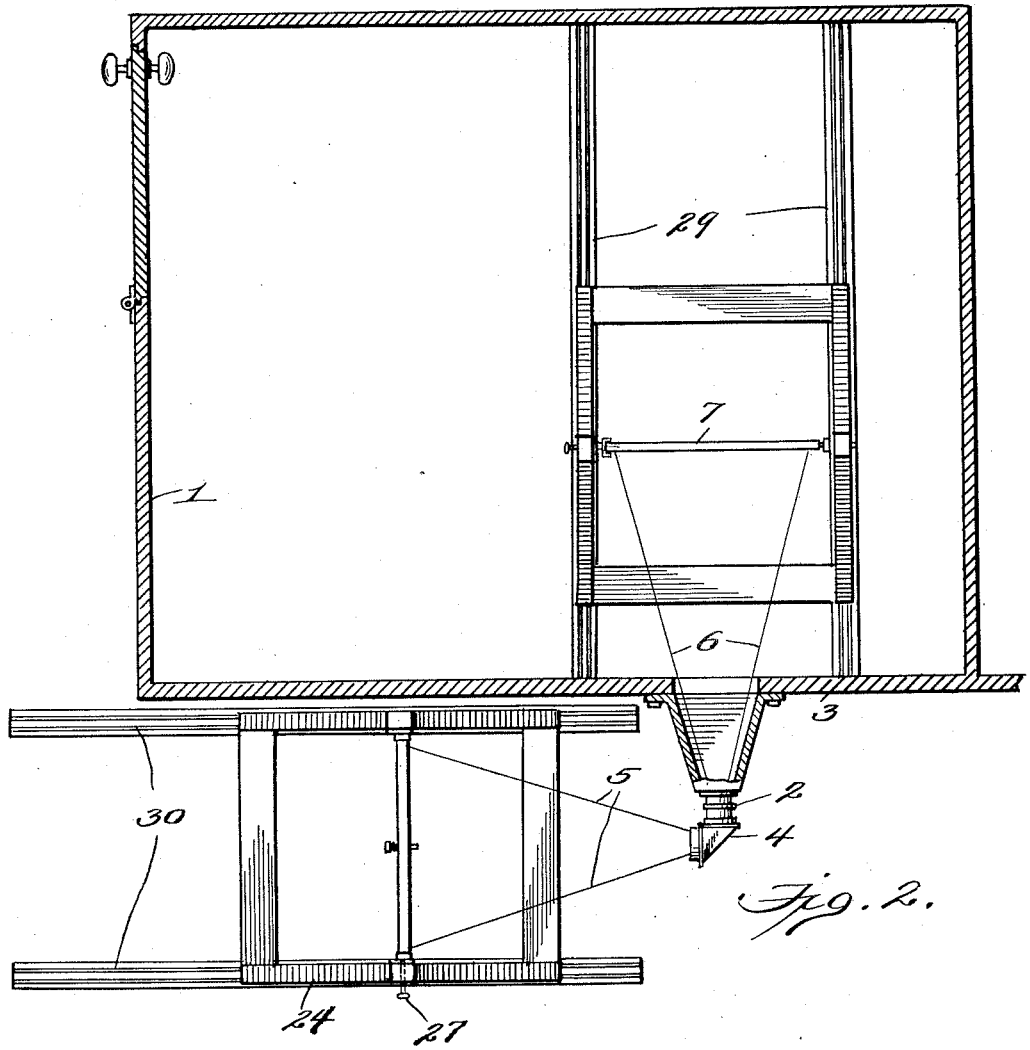

Nov. 20, 1928.
A. W. CAPS ET AL
1,692,544
PHOTOGRAPHIC COPYING MACHINE
Filed Jan. 19, 1924   3 Sheets-Sheet 3
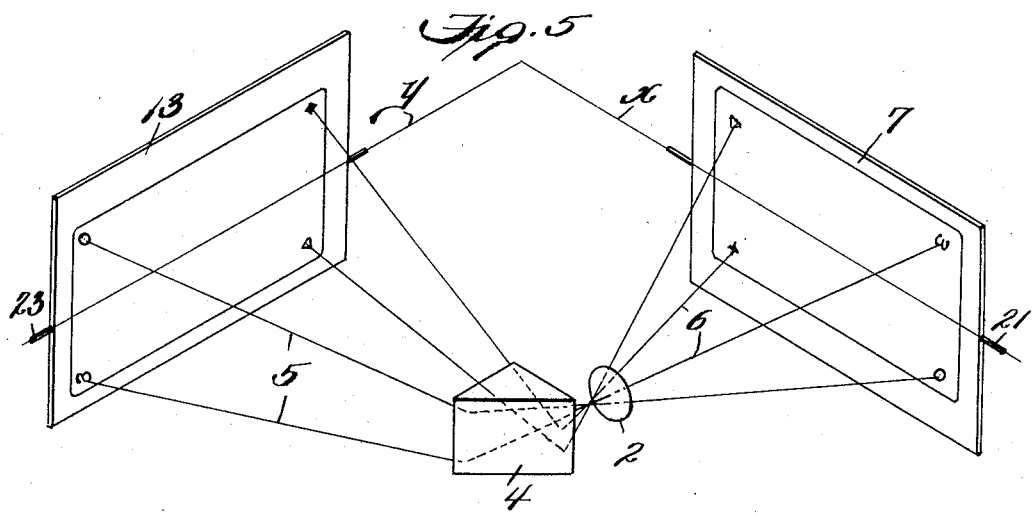
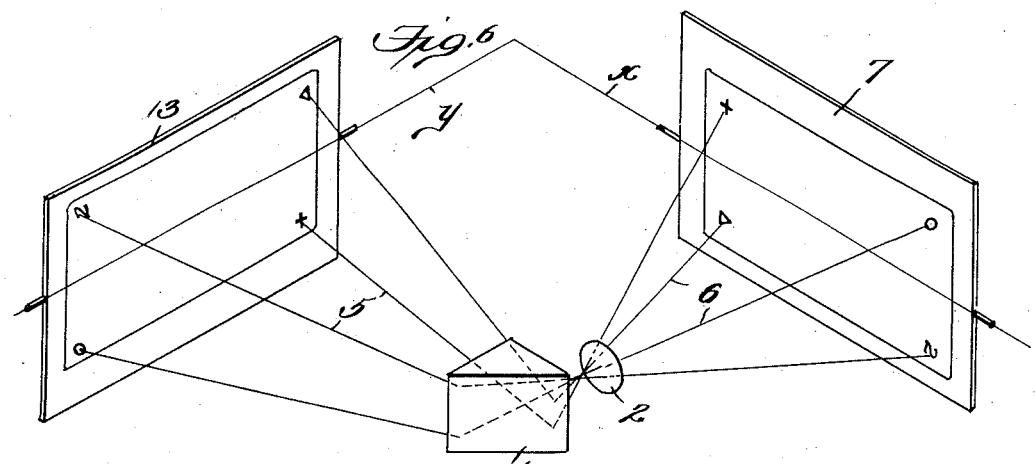
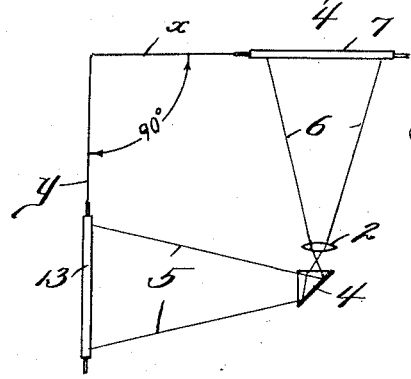
INVENTOR.
Arthur W. Caps.
Ivan E. Leininger
BY
ATTORNEY.

Patented Nov. 20, 1928.

1,692,544

UNITED STATES PATENT OFFICE.

ARTHUR W. CAPS AND IVAN E. LEININGER, OF KANSAS CITY, MISSOURI, ASSIGNORS, BY MESNE ASSIGNMENTS, TO PHOTOSTAT CORPORATION, OF PROVIDENCE, RHODE ISLAND, A CORPORATION OF RHODE ISLAND.

PHOTOGRAPHIC COPYING MACHINE.

Application filed January 19, 1924. Serial No. 687,278.

The present invention relates to improvements in photographic apparatus and more especially to machines adapted for the photographic copying or reproduction of books, records, documents and the like, an example of a machine of this general type being shown and described in Letters Patent No. 929,757, granted August 3, 1909, to Calvin J. Ellis.

The primary object of the invention is to provide novel and improved means for reversibly supporting the object to be copied or reproduced, such as a page of a book, or a document bearing printed or other matter on both sides, so that its opposite sides can be brought successively into position for reproduction, and cooperative means for reversibly supporting a sheet of photographic paper or other material sensitized on both sides whereby its opposite sensitized surfaces may be brought successively into position for exposure, the relative arrangement of said supporting means being such that when both supporting means are reversed, following the reproduction of one side of the object, to bring the other side of the object into position for reproduction, and to bring the other side of the sensitized sheet into position for exposure, the image of the object will be received on the subsequently exposed side of the sensitized sheet in proper order and relation with respect to the image on the first exposed side of the sheet; and it is a further object to enable erect reproductions of the opposite sides of the object to be made on opposite sides of sensitized sheets in such manner as to insure correct page numbering and to provide suitable binding margins on the sheets containing the reproductions.

To these and other ends, the invention consists in certain improvements and combinations and arrangements of parts, all as will be hereinafter more fully described, the features of novelty being pointed out particularly in the claims at the end of the specification.

In the accompanying drawings:—

Figure 1 is a front elevation, partly broken away, of a photographic copying machine constructed in accordance with the present invention;

Figure 2 represents a horizontal section through the machine shown in Figure 1, the section being taken on the line 2—2 of Figure 1;

Figure 3 is a detail perspective view of the preferred form of holder for the photographic paper or other sensitized sheet;

Figure 4 is a detail perspective view of the preferred form of holder for the document or other original object to be photographed or reproduced;

Figure 5 is a diagrammatic view showing the manner in which the image of the original object is received on the sensitized surface on one side of the sensitized sheet when the holders for the original object and the sensitized sheet each occupy one of their two positions;

Figure 6 is a view similar to Figure 5 but showing the manner in which the image from the second or other side of the original object is received on the other or second side of the sensitized sheet when both holders are reversed; and Figure 7 is a diagrammatic view showing the relationship between the reversible holders and the optical elements of the machine, as viewed in top plan.

Similar parts are designated by the same reference characters in the several views.

The present invention is applicable generally to photographic apparatus of various kinds, although it is particularly applicable to photographic apparatus of the kinds adapted for the photographic copying or reproduction of books, records, documents and the like, and more especially to the photographic reproduction of the printed or other matter on the opposite sides of a page of a book, record, document or the like upon the opposite sides of a sheet of photographic paper or similar material. The preferred embodiment of the invention is shown in the accompanying drawings and will be hereinafter described in detail, but it is to be understood that the invention is not restricted to the exact construction shown, as equivalent constructions are contemplated and such will be included within the scope of the claims.

In the present instance, 1 designates a casing or enclosure which may be either a dark room or it may be constructed like a camera casing, this casing in the present instance having a photographic or camera lens 2 suitably fitted to its front wall 3 and an erecting prism 4 is associated with the lens, it being generally preferable to arrange the lens and prism so that the rays 5 from the object will pass horizontally to the prism and the rays 6 emerging from the camera lens will be projected horizontally but at a right angle to the rays 5 from the object, in order that an erect image of the object will be projected onto the sensitized surface.

The photographic paper or other sensitized material upon which the reproductions are to be made is supported within the casing 1 to receive the rays 6 from the lens, by a holder 7 which preferably comprises a pair of plates or frame members 8 and 9 having registering openings $8^a$ and $9^a$ to expose the respective sides of a sheet of sensitized material held between them. The plates are preferably connected pivotally along one edge as by the hinges 10, to permit them to be readily opened and closed and thus facilitate the insertion and removal of the sheets of photographic material, and means is preferably provided for securing the plates in closed position so that they will retain the sheet of photographic material in place therein, a catch 11 being provided for this purpose in the present instance which is pivoted at 12 to one of the plates of the holder, the catch being channeled or otherwise formed to fit over the free edges of both plates when the latter are in closed position, the catch then serving to retain the holder in closed condition. In carrying out the present invention, the photographic material used is preferably photographic paper which is sensitized on both sides, and when the sheets of photographic paper are placed in the holder 7, the portions of the respective sensitized surfaces on opposite sides of the sheet, which are to be exposed, are outlined by the edges of the openings $8^a$ and $9^a$ of the holder. In order to adapt the photographic reproductions for binding in book or similar form, the exposure openings $8^a$ and $9^a$ of the holder are preferably offset from one edge thereof, as, for example, the edge adjacent to the hinges, as shown, so that a blank or unexposed margin will be left along the corresponding edge of the photographic paper which will facilitate binding of the photographic reproductions into book form.

A holder 13 is provided for the original objects or documents to be photographed. This holder comprises preferably a frame 14 having a pair of frames 15 and 16 pivotally mounted therein, as by the hinges 17, these latter frames carrying sheets of glass 18 and 19 between which the original object, which may be in the form of a document having printed or other matter on its opposite sides, is held, the opposite sides of the original object or document being exposed through the respective glass plates 18 and 19. The object may be readily inserted or removed when the frames 15 and 16 are swung outwardly from the frame 14 and are relatively separated, as shown in Figure 4, and when the frames 15 and 16 are swung against one another and these two frames are swung into the plane of the frame 13, the original object is held in position for reproduction. A suitable catch 20 may be provided on the frame 14 to retain the frames 15 and 16 in operative position therein.

In order to enable the two sides of the original object contained in the holder 13 to be photographed successively, without the necessity of removing either the original object or the sheet of photographic material from its holder, the holders 7 and 13 are both mounted reversibly so that the rear side of the original object can be easily and quickly brought into position for photographing, after the one side of the object has been photographed and the opposite side or second sensitized surface on the photographic sheet may be brought into position for exposure after the other sensitized surface thereon has been exposed. Preferably and as shown in the present instance, the plate or frame member 8 of the holder 7 is provided for this purpose with trunnions 21 which are alined with one another and with a median line through the exposure openings $8^a$ and $9^a$ of this holder, the trunnions being rotatably mounted in a suitable frame or support 22. Also the frame 14 of the object holder 13 is provided with trunnions 23 which are alined with one another and with a median line through its holder, these trunnions of the object holder being rotatably mounted in a suitable frame or support 24. By mounting the holders 7 and 13 as described, one side of the object may be held in position for photographing, while one side of the photographic material is held in position for exposure to the image of that side of the object and after a photograph has been made of this side of the object, the object and also the photographic material may be easily and quickly reversed to bring the second side of the object into position for photographing and to bring the second sensitized surface on the photographic sheet into position to receive an exposure therefrom. Any suitable means may be provided for temporarily retaining the holders 7 and 14 in each of their two operative positions as described. For example, a plunger 25 having a fork 26 at one end may be slidably fitted in the frame or support 22 in position to cause its forked end en engage the adjacent edge of the holder 7 when the latter occupies either of its two positions, the plunger being withdrawable to release the holder preparatory to reversal thereof; and a similar plunger 27 may be fitted to reciprocate in the frame or support 24, the end of this plunger, however, being adapted to engage any one or the other of a pair of holes or recesses 28 which are formed in the adjacent edge of the frame 14 of the holder 13, when the latter occupies either of its two operative positions.

In order to obtain reproductions on the opposite sides of the photographic sheet which will correspond in their relationship with the relationship of the printed or other matter on opposite sides of the original object, the axes of the trunnions 21 and 23 of the holders 7 and 13 must be arranged in the same plane. This will be clear from the diagrams, Figures 5 and 6, where the axis $x$ of the trunnions 21 on the holder 7 intersects the axis $y$ of the trunnions 23 of the holder 13. Moreover, the axes $x$ and $y$ form an angle of 90 degrees with one another, as indicated in Figure 7, to conform with the right angular bend in the optical system of the camera, as produced by the erecting prism 4. The plane in which the axes $x$ and $y$ lie coincides with the optical axis of the camera so that the holder 7, when in either of its two operative positions, will present the photographic sheet in the focal plane of the lens and the holder 13, when in either of its two operative positions, will present the original object in a plane perpendicular to the optical axis of the lens 2 and prism 4. A comparison of Figures 5 and 6 shows that with the holders 7 and 13 mounted in the manner described, the reproductions made on the opposite sides of the sensitized sheet will bear the same relationship between them as is borne between the printed or other matter on the opposite sides of the original object. The invention thus enables facsimile reproductions to be obtained, and, moreover, the page numbering of the reproductions will be in proper order. Furthermore, as the marginal portions of the holder are eccentric to the registered exposure openings in the respective holders, relatively wide margins suitable for binding will be produced on opposite sides of the photographic sheet along the same edge thereof, due to the masking of the marginal portions of the sheet by the marginal portions of the sheet holder.

The frames or supports 22 and 24, as shown, serve as slides which are adjustable on tracks 29 and 30, the tracks 29 extending parallel with the optical axis of the lens 2 at the side thereof at which the photographic sheet is placed, and the tracks 30 extending parallel to the axis of the optical system of the apparatus toward the side of the lens and prism at which the object to be photographed is placed, adjustments of these slides enabling the apparatus to be properly focussed and adjusted to produce reproductions of the desired sizes.

We claim as our invention:—

1. In photographic copying apparatus embodying an erecting optical system including a prism for directing the light rays of an object at right angles, of an object holder and a holder for sensitized material, supports for said holders upon which they are reversible on axes which intersect and lie in the planes of the respective holders, and a dark cabinet enclosing the holder for sensitized material, the other holder being arranged exteriorly of said dark cabinet.

2. In photographic copying apparatus embodying an erecting optical system including a prism for directing the light rays of an object at right angles, of an object holder and a holder for positioning a sensitized sheet for exposure, supports for said holders upon which they are reversible on axes which lie in the normal planes of the respective holders and at the intersections of such planes with a plane which is common to said axes and to the axis of the optical system, and a dark cabinet enclosing the holder for sensitized material, the other holder being arranged exteriorly of said dark cabinet.

3. In a photographic copying machine embodying a camera lens and an erecting prism associated therewith, an object holder for positioning an object to be photographed and a holder for positioning either of the two sides of a sensitized sheet for exposure, said holders being rotatable on intersecting axes which lie in a common plane with the optical axis of the lens and prism and at the intersections of said plane with the planes of the respective holders.

4. In a photographic copying machine embodying a camera lens and image erecting means cooperative therewith, an object holder for positioning an object to be photographed, and a holder for positioning a sensitized sheet for exposure, said holders having supporting trunnions about which they are rotatable to bring one or the other side of the object or sensitized sheet into operative position, the axes of the trunnions of said holders being in angular relation but lying in the same plane.

5. A holder for positioning a sheet of sensitized paper for exposure comprising a pair of hinged plates having registering openings eccentrically located with respect to the holder to form a binding margin on the paper and trunnions on said holder located concentrically with said registering openings but eccentric to said hinged plates.

6. In a phtographic copying machine, a holder for positioning a sheet of sensitized paper for exposure comprising plates adapted to receive the sheet of paper between them and having registering openings eccentrically located with respect to the holder to form a binding margin on the paper, and trunnions on the holder located concentrically with said registering openings but eccentric to said plates, in combination with a copy holder pivoted on an axis located in the same plane with the axis of the trunnions of the paper holder, and having exposure openings therein, said axis of the copy-holder being located centrally of said exposure openings of the copy holder.

7. In a photographic copying machine, a copy holder having opposite exposure openings, a sensitized sheet holder having opposite exposure openings, said holders being reversible about axes which extend centrally through the exposure openings and lie in the planes of the respective holders, and a lens and prism arranged in alinement with the centers of the opposite exposure openings in said holder.

8. In a photographic copying machine, a copyholder having opposite exposure openings, a sensitized sheet holder having opposite exposure openings, said holders embodying means for respectively positioning the copy and sensitized sheet therein eccentrically of the respective exposure openings, and a lens and prism system having its optical axis arranged in concentric relation with the exposure openings of both of said holders.

9. In a photographic copying machine, the combination with an exposing lens, of a holder for positioning the opposite sides of a sensitized sheet for exposure by the lens, comprising a pair of masks spaced to receive the sensitized sheet between them and having registered exposure openings and wide and narrow masking margins on opposite sides of the latter, and means for supporting the holder for rotation on an axis which lies in the plane of the holder and passes symmetrically through the area of the exposure openings therein.

10. In a photographic machine for copying pages, a lens and prism, a page-holder mounted for reversal to present opposite sides of a page to the lens and prism, and a sensitized paper holder arranged to receive images in proper registration from the page holder and mounted for reversal to expose in proper arrangement the opposite sides of the sensitized paper.

In testimony whereof we have hereunto set our hands.

ARTHUR W. CAPS.
IVAN E. LEININGER.